United States Patent [19]

Kimura

[11] Patent Number: 4,841,508

[45] Date of Patent: Jun. 20, 1989

[54] METHOD AND APPARATUS FOR DETECTING A TRACK AND FOCUS ERRORS IN AN OPTICAL HEAD

[75] Inventor: Yasuo Kimura, Tokyo, Japan

[73] Assignee: NEC Corporation, Tokyo, Japan

[21] Appl. No.: 138,484

[22] Filed: Dec. 28, 1987

[30] Foreign Application Priority Data

Dec. 25, 1986 [JP] Japan .................................. 61-310311
Mar. 20, 1987 [JP] Japan .................................. 62-66178
Apr. 8, 1987 [JP] Japan .................................. 62-87658

[51] Int. Cl.$^4$ ............................................. G11B 7/125
[52] U.S. Cl. .......................................... 361/45; 369/46
[58] Field of Search ........................ 350/201 DF, 202; 369/44, 45, 46, 112

[56] References Cited

U.S. PATENT DOCUMENTS 4,631,397  12/1986  Ohsato et al. .................... 250/201
4,689,781  8/1987   Ando ................................ 369/112
4,753,513  6/1988   Shikama ............................ 369/45

OTHER PUBLICATIONS

Bulthuis et al., "Ten Billion Bits on a Disk", IEEE Spectrum, Aug. 1979, pp. 26–33.
Heemskerk, "Noise in a Video Disk System . . . Laser", Applied Optics, vol. 17, No. 13, Jul. 1, 1978, pp. 2007–2012.
Bouwhuis et al., "Video Disk Player Optics", Applied Optics, vol. 17, No. 13, Jul. 1, 1978, pp. 1993–2000.
Bricot et al., "Optical Readout of Videodisc", IEEE Transactions on Consumer Electronics, Nov. 1976, pp. 304–308.

Primary Examiner—Donald McElheny, Jr.
Attorney, Agent, or Firm—Sughrue, Mion, Zinn, Macpeak and Seas

[57] ABSTRACT

A method and apparatus for detecting a track and focus errors in an optical head comprises a step of dividing light beam which is reflected from a recording medium into at least a first, second, and third light beams belonging to first, second and third cross sectional regions thereof, and means therefor. The first region is expressed in its cross sectional position by the equations, $$\left(X - \delta \cdot \frac{d}{F}\right)^2 + Y^2 \leq \left(\frac{d}{2}\right)^2$$

$$\left(X + \delta \cdot \frac{d}{F} + \frac{f\lambda}{P} \cdot \frac{d}{F}\right)^2 + Y^2 \leq \left(\frac{d}{2}\right)^2$$

the second region is expressed in its cross sectional position by the equations, $$\left(X + \delta \cdot \frac{d}{F}\right)^2 + Y^2 \leq \left(\frac{d}{2}\right)^2$$

$$\left(X - \delta \cdot \frac{d}{F} - \frac{f\lambda}{P} \cdot \frac{d}{F}\right)^2 + Y^2 \leq \left(\frac{d}{2}\right)^2$$

the third region is excluded from said first and second regions and expressed in its cross sectional position by the equations, $$\left(X + \delta \cdot \frac{d}{F} - \frac{f\lambda}{P} \cdot \frac{d}{F}\right)^2 + Y^2 \geq \left(\frac{d}{2}\right)^2$$

$$\left(X - \delta \cdot \frac{d}{F} + \frac{f\lambda}{P} \cdot \frac{d}{F}\right)^2 + Y^2 \geq \left(\frac{d}{2}\right)^2$$

where P is a pitch of pits or pregrooves of the recording medium, $\lambda$ is a wavelength of the light beam, $\delta$ is a value which is from equal to or more than zero to equal to or less than a maximum moving distance of the object lens in a direction of a track error, d is a diameter of the light beam which is reflected, X is an axis which is parallel to a track error direction to intersect the light axis of said light beam which is reflected, and Y is an axis which is orthogonal to the X to intersect said light axis. The track error is detected in accordance with the light beams of the first and second regions, and the focus error is detected in accordance with the light beam of the third region.

8 Claims, 14 Drawings Sheets

FIG. 3C  DEVIATION OF SPOT ON LEFT SIDE

FIG. 3B  SPOT ON TRACK

FIG. 3A  DEVIATION OF SPOT ON RIGHT SIDE

PRIOR ARTS

DEVIATION OF SPOT ON RIGHT SIDE

SPOT ON TRACK

DEVIATION OF SPOT ON LEFT SIDE

METHOD AND APPARATUS FOR DETECTING A TRACK AND FOCUS ERRORS IN AN OPTICAL HEAD

FIELD OF THE INVENTION

The invention relates to a method and apparatus for detecting a track and focus errors in an optical head, and more particularly to a method and apparatus for detecting a track and focus errors in an optical head by which informations are written into and read out of such a recording medium as an optical disk, digital audio disk, video disk, magneto-optical disk and so on.

BACKGROUND OF THE INVENTION

In a conventional apparatus for detecting a track and focus errors in an optical head, a track error is detected, for instance, by one of a push-pull, heterodyne and three beams methods, while a focus error is detected, for instance, by one of a foucault and critical angle methods. Some of the methods are described in reports entitled "Ten billion bits on a disk" on pages 26 to 33 of "IEEE spectrum, August 1979, "Noise in a video disk system: experiments with an (AlGa)As laser" on pages 2007 to 2012 of "Applied Optics, Vol. 17, No. 13, 1 July 1978", "Video disk player optics" on pages 1993 to 2000 of "Applied Optics, Vol. 17, No. 13, 1 July 1978", and "Optical Readout of Video disk" on pages 304 to 308 of "IEEE Transaction on Consumer Electronics, November 1976". The details of these methods will be described later in more detail.

According to the conventional apparatus for detecting a track and focus errors in an optical head, however, there are disadvantages as follows.

(a) Track error

In the push pull method, at first, an object lens is actuated dependent on the amplitude and polarity of a track error signal to move perpendicularly to the light axis thereof by an actuator. In the occasion, the light axis of the object lens is liable to deviate from a dividing line of a two-divided optical detector so that light beam which is reflected from an optical disk is not exactly divided into two light beams to be equal in their light amounts of the dividing line. As a result, a direct current offset is induced in a track error signal so that a scope of controlling a track error becomes narrower. Such a disadvantage is also occured even in a case where an optical disk is inclined.

In the heterodyne method in which a track error signal is produced in accordance with a diffraction pattern formed at an edge of each pit on an optical disk, secondly, no track error signal can be detected from such a recording medium as having no pit, but pregrooves. Even more, an electric circuit becomes complicated because a heterodyne detection etc. are utilized therein.

In the three beams method in which a swing arm is adopted to forward a carriage, thirdly, a fluctuation of a signal intensity is occurred dependent on a rotating angle of the swing arm.

(b) Focus error

A focus error is detected in accordance with a focus error signal component of light beam including a RF and track error signal components which is reflected from an optical disk. For this reason, the other signal components, especially, the track error signal component is liable to be included in the focus error signal. As a result, the precision of controlling a focus error is decreased.

SUMMARY OF THE INVENTION

Accordingly, it is an object of the invention to provide a method and apparatus for detecting a track and focus errors in an optical head in which no direct current offset is induced in detecting a track error.

It is a further object of the invention to provide a method and apparatus for detecting a track and focus errors in an optical head in which the construction of a circuit for detecting a track error is not complicated.

It is a still further object of the invention to provide a method and apparatus for detecting a track and focus errors in an optical head in which a track error signal is not fluctuated even if the surrounding condition is changed.

It is a yet still further object of the invention to provide a method and apparatus for detecting a track and fucus errors in an optical head in which the precision of controlling a focus error is improved.

According to one aspect of the invention, a method for detecting a track and focus errors in an optical head comprises steps of, radiating light beam to be directed to a recording medium, and detecting light amount of light beam which is reflected through an object lens from said recording medium wherein said light beam which is reflected is divided in its cross section into light beams of at least a first, second and third regions, said first region being expressed in its cross sectional position by the equations, $$\left(X - \delta \cdot \frac{d}{F}\right)^2 + Y^2 \leq \left(\frac{d}{2}\right)^2$$
$$\left(X + \delta \cdot \frac{d}{F} + \frac{f\lambda}{P} \cdot \frac{d}{F}\right)^2 + Y^2 \leq \left(\frac{d}{2}\right)^2$$

said second region being expressed in its cross sectional position by the equations, $$\left(X + \delta \cdot \frac{d}{F}\right)^2 + Y^2 \leq \left(\frac{d}{2}\right)^2$$
$$\left(X - \delta \cdot \frac{d}{F} - \frac{f\lambda}{P} \cdot \frac{d}{F}\right)^2 + Y^2 \leq \left(\frac{d}{2}\right)^2$$

and said third region being excluded from said first and second regions and expressed in its cross sectional position by the equations, $$\left(X + \delta \cdot \frac{d}{F} - \frac{f\lambda}{P} \cdot \frac{d}{F}\right)^2 + Y^2 \geq \left(\frac{d}{2}\right)^2$$
$$\left(X - \delta \cdot \frac{d}{F} + \frac{f\lambda}{P} \cdot \frac{d}{F}\right)^2 + Y^2 \geq \left(\frac{d}{2}\right)^2$$

where P is a pitch of pits or pregrooves of said recording medium, λ is a wavelength of said light beam, δ is a value which is from equal to or more than zero to equal to or less than a maximum moving distance of said object lens in a direction of a track error, d is a diameter of said light beam which is reflected, X is an axis which is parallel to a track error direction to intersect the light axis of said light beam which is reflected, and Y is an axis which is orthogonal to said X to intersect said light axis, and a track error being detected in accordance with said light beams of said first and second regions, and a focus error being detected in accordance with said light beam of said third region.

According to another aspect of the invention, an apparatus for detecting a track and focus errors in an optical head comprises, a light source for radiating light beam, an object lens for focusing said light beam on a recording medium, means for dividing light beam which is reflected from said recording medium in its cross section into light beams of at least a first, second and third regions, and means for detecting respective light amounts of said light beams to produce a track and focus error signals, wherein said first region is expressed in its cross sectional position by the equations, $$\left. \begin{array}{l} \left(X - \delta \cdot \dfrac{d}{F}\right)^2 + Y^2 \leq \left(\dfrac{d}{2}\right)^2 \\ \left(X + \delta \cdot \dfrac{d}{F} + \dfrac{f\lambda}{P} \cdot \dfrac{d}{F}\right)^2 + Y^2 \leq \left(\dfrac{d}{2}\right)^2 \end{array} \right\}$$

said second region is expressed in its cross sectional position by the equation, $$\left. \begin{array}{l} \left(X + \delta \cdot \dfrac{d}{F}\right)^2 + Y^2 \leq \left(\dfrac{d}{2}\right)^2 \\ \left(X - \delta \cdot \dfrac{d}{F} - \dfrac{f\lambda}{P} \cdot \dfrac{d}{F}\right)^2 + Y^2 \leq \left(\dfrac{d}{2}\right)^2 \end{array} \right\}$$

and said third region is excluded from said first and second regions and expressed in its cross sectional position by the equations, $$\left. \begin{array}{l} \left(X + \delta \cdot \dfrac{d}{F} - \dfrac{f\lambda}{P} \cdot \dfrac{d}{F}\right)^2 + Y^2 \geq \left(\dfrac{d}{2}\right)^2 \\ \left(X - \delta \cdot \dfrac{d}{F} + \dfrac{f\lambda}{P} \cdot \dfrac{d}{F}\right)^2 + Y^2 \geq \left(\dfrac{d}{2}\right)^2 \end{array} \right\}$$

where P is a pitch of pits or pregrooves of said recording medium, λ is a wavelength of said light beam, δ is a value which is from equal to or more than zero to equal to or less than a maximum moving distance of said object lens in a direction of a track error, d is a diameter of said light beam which is reflected, X is an axis which is parallel to a track error direction to intersect the light axis of said light beam which is reflected, and Y is an axis which is orthogonal to said X to intersect said light axis, and said track error being detected in accordance with said light beams of said first and second regions, and said focus error being detected in accordance with said light beam of said third region.

BRIEF DESCRIPTION OF THE DRAWINGS

The invention will be explained in more detail in conjunction with following drawings wherein.

DESCRIPTION OF PREFERRED EMBODIMENTS

Before explaining a preferred embodiment according to the invention, conventional apparatus for detecting a track and focus errors in an optical head will be described.

Figure 1:
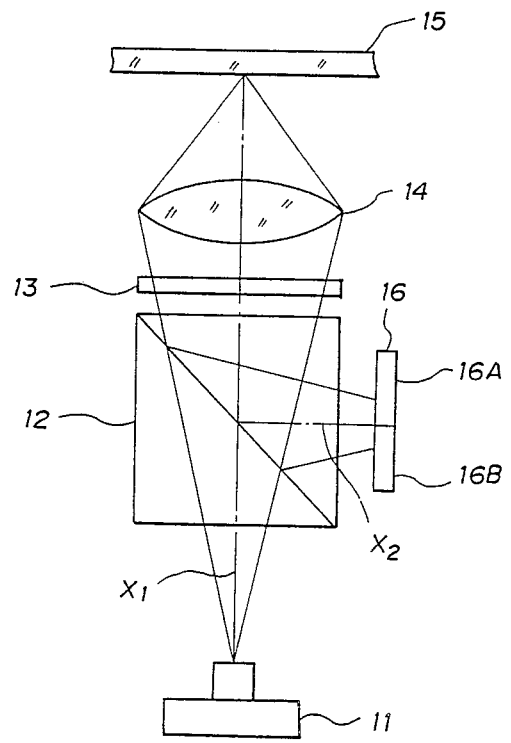
FIG. 1 is an explanatory view showing a first conventional apparatus for detecting a track error in an optical head by the push-pull method.

In FIG. 1, there is shown a first conventional apparatus for detecting a track error in an optical head by the push-pull method which comprises a semiconductor laser 11 for radiating light beam, a polarizing beam splitter 12 for passing the light beam from the semiconductor laser 11 and for selecting light beam in the direction opposite thereto, a ¼ wavelength plate 13 for converting light beam from the polarizing beam splitter 2 into circularly polarized light beam and for converting light beam in the direction opposite thereto into linearly polarized light beam, an object lens 14 for focusing the circularly polarized light beam on an optical disk 15 and for focusing light beam reflected from the optical disk 15, and an optical detector 16 having a first and second optical detecting segments 16A and 16B for receiving light beam reflected by the polarizing beam splitter 12 to detect a track error by the push-pull method.

In operation, light beam radiated on the light axis X1 from the semiconductor laser 11 is passed through the polarizing beam splitter 12 and then converted into the circularly polarized light beam at the ¼ wavelength plate 13. The circularly polarized light beam is focussed on the optical disk 15 and then reflected therefrom to be focussed by the object lens 14. The light beam thus focussed is converted into the linearly polarized light beam at the ¼ wavelength plate 13 and then reflected on the light axis X2 by the polarizing beam splitter 12. The light beam thus reflected is received in the optical detecting segments 16A and 16B of the optical detector 16. Thus, a track error signal is supplied from the optical detector 16 in which the calculation of the subtraction between outputs of the optical detecting segments 16A and 16B is performed to detect a track error.

Figure 2:
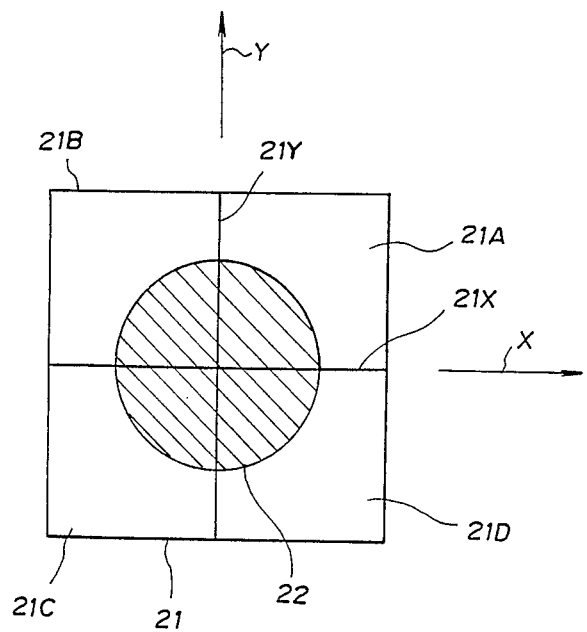
FIG. 2 is an explanatory view showing a four-divided optical detector for detecting a track error by the conventional push-pull method.

In FIG. 2, there is shown an optical detector 21 having a first to fourth optical detecting segments 21A to 21D which are divided by a first and second dividing lines 21X and 21Y in a first and second directions of a track and pit directions X and Y. A reflecting light spot 22 is formed on the optical detector 21. It is assumed that the optical detector 21 is positioned on a far-field to detect a track error of a track having a series of pits each of a depth λ/5, where λ is a wavelength of light beam which is focussed on the track.

In the optical detector 21, signals of PP, HTD and RF are obtained in following calculations (1) to (3).

$$PP = (a+d) - (b+c) \quad (1)$$

$$HTD = (a+c) - (b+d) \quad (2)$$

$$RF = a+b+c+d \quad (3)$$

where a, b, c and d are outputs of the optical detecting segments 21A, 21B, 21C and 21D of the optical detector 21.

In the push-pull method, the PP signal obtained in the above equation (1) is utilized as a track error signal. As clearly understood from the equation (1), the optical detecting segments 21A and 21D, and 21B and 21C may be of a single optical detecting element to detect a track error so that a four-divided optical detector may be replaced by a two-divided optical detector as shown in FIG. 1 for the same purpose.

Figure 3:
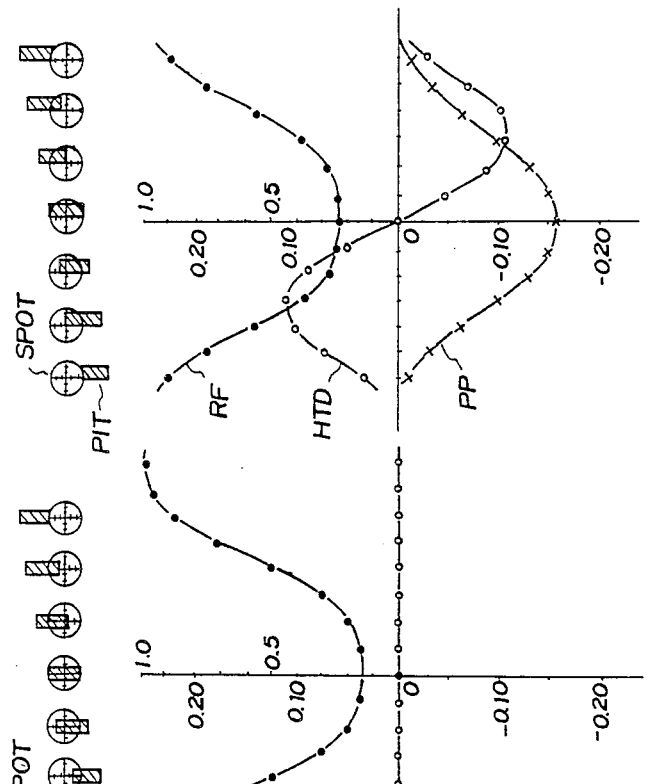
FIGS. 3A to 3C are explanatory diagrams showing PP, HTD and RF signals.

In FIGS. 3A to 3C, there are shown wave forms of the PP, HTD and RF signals. In the push-pull method, the PP signal is positive or equal to zero in a case where a spot of light beam is deviated on the right side of the track, or positioned exactly on the track, while the PP signal is negative in a case where a spot of light beam is deviated on the left side of the track. Accordingly, an object lens is actuated to move in a left and right directions vertical to the light axis thereof dependent on the polarity of the PP signal. In the heterodyne method, on the other hand, the direction of a track error is detected dependent on whether a phase of the HTD signal is "lead" or "lag" in regard to the RF signal by ninety degrees as shown in FIGS. 3A and 3C, while the HTD signal is constantly zero as shown in FIG. 3B in a case where a spot of light beam is positioned on the track. For the purpose of detecting the phase of the HTD signal is regard to the RF signal, a heterodyne detection is used in an error detecting system.

Figure 4:
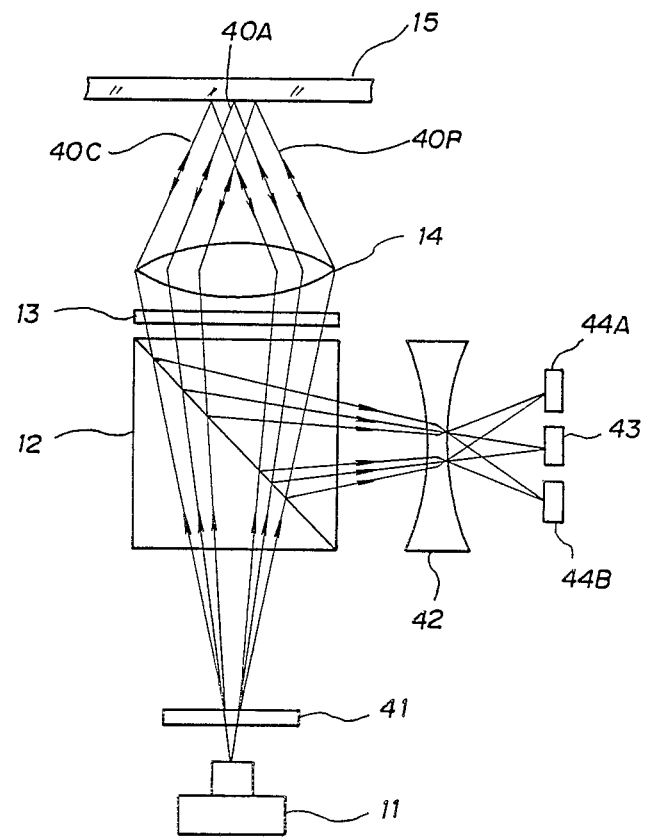
FIG. 4 is an explanatory view showing a second conventional apparatus for detecting a track error in an optical head by the three beams method.

In FIG. 4, there is shown a second conventional apparatus for detecting a track error in an optical head by the three beams method in which like parts are indicated by like reference numerals in FIG. 1 except that a diffraction grating 411 and concave lens 42 are further provided, and the optical detector 16 is replaced by a four-divided optical detector 43, and a first and second optical detector 44A and 44B.

Figure 5A:
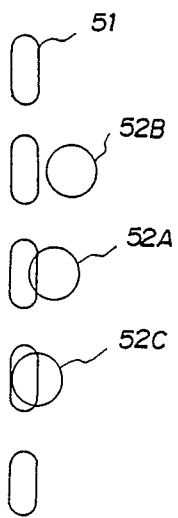
FIGS. 5A to 5C are explanatory diagrams showing the three beams method.
Figure 5B:
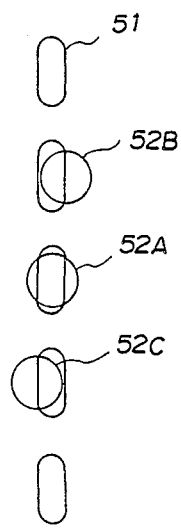
Figure 5C:
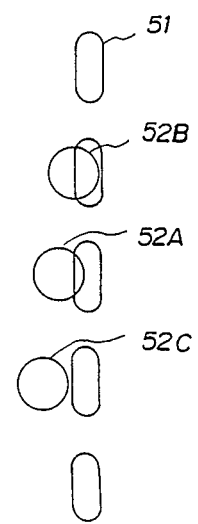

In operation, light beam from the semiconductor laser 11 is diffracted by the diffraction grating 41 so that three light beams of main beam 40A, and positive and negative first-order diffraction beams 40B and 40C are focused on the optical disk 15 by the object lens 14. As a result, three spots of main spot 52A, and a first and second auxiliary spots 52B and 52C are formed along a series of pits 51 on the optical disk 15 as shown in FIGS. 5A to 5C. In a case where the main spot 52A is deviated on the right side of a track as shown in FIG. 5A, light beam reflected on the second auxiliary spot 52C is lower in its intensity than light beam reflected on the first auxiliary spot 52B because the former is diffracted by the pit 21, while light beams reflected on the first and second auxiliary spots 52B and 52C are equal in their intensity to each other in a case where the main spot 52A is positioned exactly on the track as shown in FIG. 5B. On the other hand, light beam reflected on the first auxiliary spot 52B is lower in its intensity than light beam reflected on the second auxiliary spot 52C in a case where the main spot 52A is deviated on the left side of a track as shown in FIG. 5C. Therefore, a track error signal is obtained in the calculation of the subtraction between outputs of the first and second optical detectors 44A and 44B which receive light beams reflected on the first and second auxiliary spots 52B and 52C.

Figure 6:
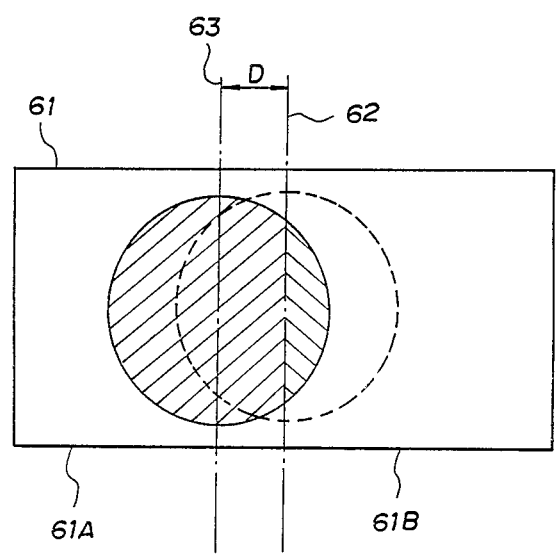
FIG. 6 is an explanatory view showing a two-divided optical detector in which a direct current offset is explained.

In FIG. 6, there is shown a two-divided optical detector 61 having a first and second optical detecting segments 61A and 61B which are divided by a dividing line 62 in which a track error is detected by the push-pull method. If a track error is detected, an object lens having the light axis 63 is actuated to move in a left and right directions orthogonal to the light axis 63 by a distance D. As a result, light beam reflected from an optical disk is not exactly divided on the dividing line 62, but on the light axis 63 of the object lens so that an incident light to the optical detecting segment 61A is larger in its light amount than that to the optical detecting segment 61B. Consequently, a direct current offset is induced in a track error signal so that a scope of controlling a track error becomes narrower as mentioned before.

Figure 7:
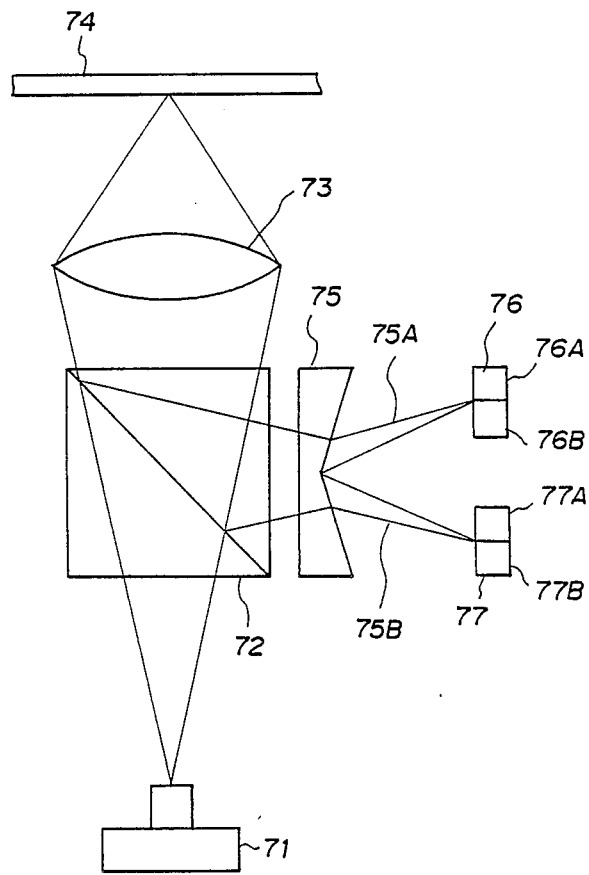
FIGS. 7 and 8 are explanatory views showing a third and fourth conventional apparatus for detecting a focus error in an optical head.

In FIG. 7, there is shown a first conventional apparatus for detecting a focus error in an optical head by the foucault method which comprises a semiconductor laser 71 for radiating light beam, a beam splitter 72 for passing the light beam from the semiconductor laser 71 and for reflecting light beam in a direction opposite thereto, an object lens 73 for focusing light beam from the beam splitter 72 on an optical disk 74 and for focusing light beam reflected from the optical disk 74, a foucoult prism 75 for dividing light beam reflected by the beam splitter 72 into two light beams 75A and 75B, and a first and second optical detectors 76 and 77 each having two optical detecting segments 76A and 76B, and 77A and 77B.

In operation, light beam radiated from the semiconductor laser 71 and then passed through the beam splitter 72 is focussed on the optical disk 74 by the object lens 73. The light beam thus focussed is reflected from the optical disk 74 and then focussed by the object lens 73. The light beam thus focussed is reflected by the beam splitter 72 to be divided into the two light beams 75A and 75B by the foucault prism 75. The light beams 75A and 75B are received in the optical detectors 76 and 77 respectively. In a case where the light beam is exactly focussed on the optical track, the light beams 75A and 75B are focussed on a first and second dividing lines for dividing the two optical detecting segments 76A and 76B of the first optical detector 76, and two optical detecting segments 77A and 77B of the second optical detector 77. On the other hand, in a case where a distance between the optical disk 74 and object lens 73 is shorter than a focal length of the object lens 73, the light beams 75A and 75B are received in the optical detecting segments 76A and 77B respectively. While, in a case where the distance is longer than the focal length, the light beams 75A and 75B are received in the optical detecting segments 76B and 77A respectively. Therefore, a focus error signal is obtained in the calculation of the addition between outputs of the first and second optical detectors 76 and 77 which are obtained in the calculation of the subtraction between outputs of the optical detecting segments 76A and 76B, and of the subtraction between outputs of the optical detecting segments 77A and 77B respectively.

Figure 8:
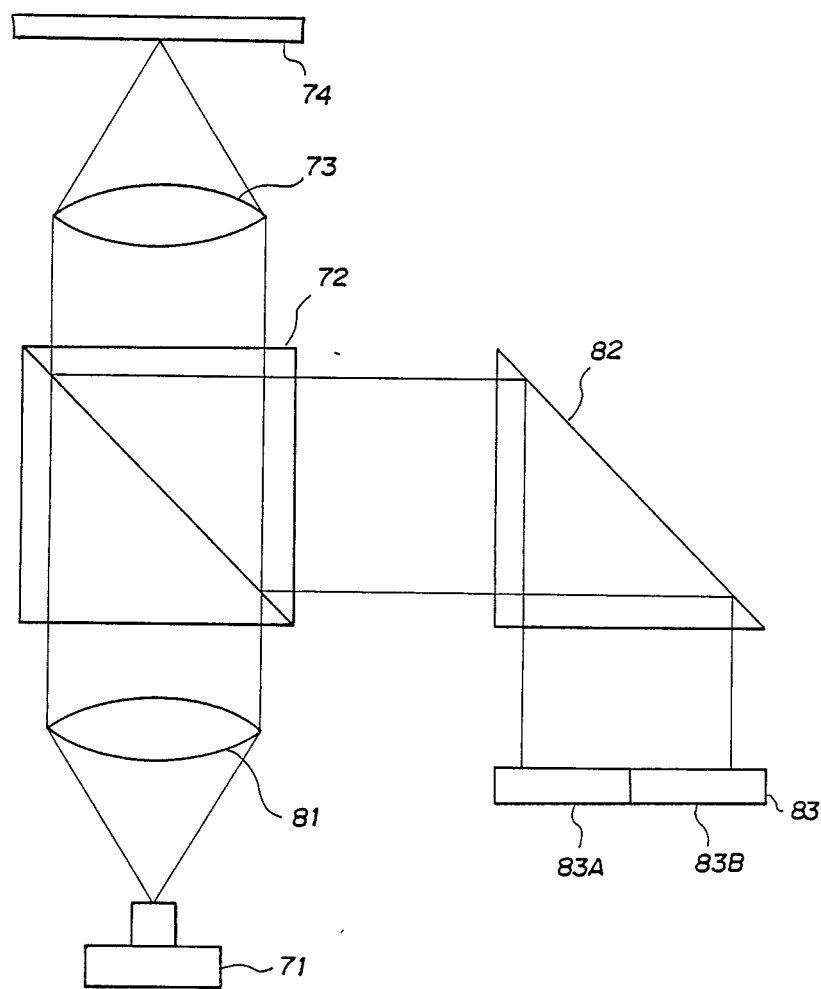

In FIG. 8, there is shown a second conventional apparatus for detecting a focus error in an optical head by the critical angle method in which like parts are indicated by like reference numerals in FIG. 7 except that a collimating lens 81 is further provided, and the foucault prism 75 and first and second optical detectors 76 and 77 are replaced by a critical angle prism 82 and optical detector 83 having two optical detecting segments 83A and 83B.

In operation, if light beam is defocussed on the optical disk 74 by the object lens 73, an incident angle of light beam to the critical angle prism 82 is deviated dependent on the defocusing extent so that a light amount of light beam which is reflected by the critical angle prism 82 is changed whereby a focus error signal is obtained in the calculation of the subtraction between outputs of the two optical detecting segments 83A and 83B of the optical detector 83.

Figure 9:
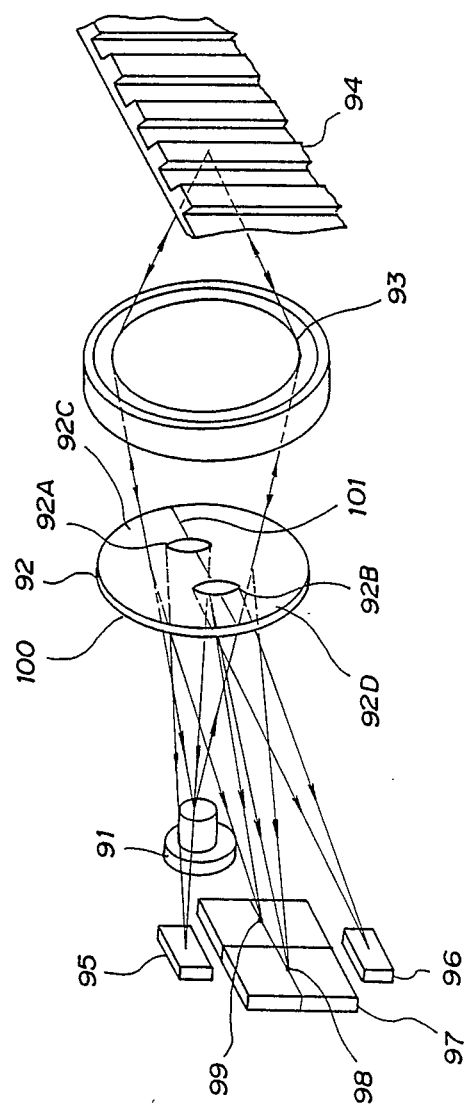
FIG. 9 is an explanatory view showing an apparatus for detecting a track and focus errors in an optical head in a first embodiment according to the invention.

In FIG. 9, there is shown an apparatus for detecting a track and focus errors in an optical head in a first embodiment according to the invention. The apparatus for detecting a track and focus errors in an optical head comprises a semiconductor laser 91 from which light beam radiates, a hologram 92 having a first to fourth regions 92A to 92D for diffracting light beam, an object lens 93 for focusing light beam from the hologram 92 on an optical disk 94 and for focusing light reflected from the optical disk 94, a first and second optical detector 95 and 96 for receiving light beams diffracted by the first and second regions 92A and 92B of the holograms 92, and a four-divided optical detector 97 for receiving light beams diffracted by the third and fourth regions 92C and 92D of the hologram 92. The hologram 92 is of a diameter much bigger than that of the light beam and is provided on one surface of a transparent base plate 100.

The first region 92A of the halogram 92 is expressed by the following equations, $$\left(X - \delta \cdot \frac{d}{F}\right)^2 + Y^2 \leq \left(\frac{d}{2}\right)^2$$

$$\left(X + \delta \cdot \frac{d}{F} + \frac{f\lambda}{P} \cdot \frac{d}{F}\right)^2 + Y^2 \leq \left(\frac{d}{2}\right)^2$$

where P is a pitch of pits or pregrooves of said recording medium, $\lambda$ is a wavelength of said light beam, $\delta$ is a value which is from equal to or more than zero to equal to or less than a maximum moving distance of said object lens in a direction of a track error, d is a diameter of said light beam which is reflected, X is an axis which is parallel to a track error direction to intersect the light axis of said light beam which is reflected, and Y is an axis which is orthogonal to said X to intersect said light axis, and is provided thereon with interference fringes corresponding to two spherical waves radiating from a point on the first optical detector 95 and the semiconductor laser 91.

The second region 92B of the hologram 92 is expressed by the following equations, $$\left(X + \delta \cdot \frac{d}{F}\right)^2 + Y^2 \leq \left(\frac{d}{2}\right)^2$$

$$\left(X - \delta \cdot \frac{d}{F} - \frac{f\lambda}{P} \cdot \frac{d}{F}\right)^2 + Y^2 \leq \left(\frac{d}{2}\right)^2$$

and is provided thereon with interference fringes corresponding to two spherical waves radiating from a point on the second optical detector 96 and the semiconductor laser 91.

On the other hand, the third and fourth regions 92C and 92D of the hologram 92 is expressed by the following equations, $$\left(X + \delta \cdot \frac{d}{F} - \frac{f\lambda}{P} \cdot \frac{d}{F}\right)^2 + Y^2 \geq \left(\frac{d}{2}\right)^2$$

$$\left(X - \delta \cdot \frac{d}{F} + \frac{f\lambda}{P} \cdot \frac{d}{F}\right)^2 + Y^2 \geq \left(\frac{d}{2}\right)^2$$

and is divided by a line 101 which functions as a knife-edge and provided thereon with interference fringes corresponding to two spherical waves radiating from respective points 98 and 99 on the four-divided optical detector 97, and the semiconductor laser 91.

In operation, the light beam radiated from the semiconductor laser 91 is passed through the hologram 92 to be zero-order diffraction light and then focussed on the optical disk 94 by the object lens 93. The light beam reflected from the optical disk 94 is focussed by the object lens 93 to be diffracted at the hologram 92. The light beams diffracted by the third and fourth regions 92C and 92D of the hologram 92 are received in the four-divided optical detector 97 to produce a focus error signal. On the other hand, the light beams diffracted by the first and second regions 92A and 92B of the hologram 92 are received in the first and second optical detectors 95 and 96 respectively. A track error signal is obtained in the calculation of the subtraction between outputs of the first and second optical detectors 95 and 96.

Here, the principle of the invention will be explained in more detail.

Figure 10:
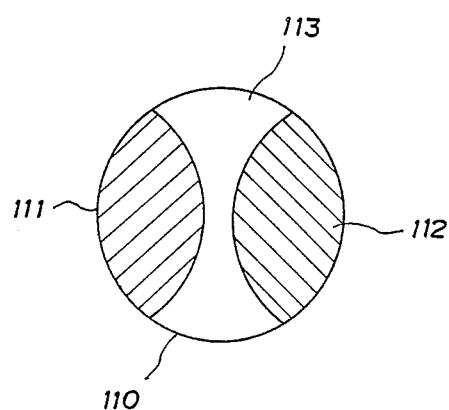
FIGS. 10, and 11A to 11C are explanatory diagrams explaining operation of the first embodiment.

It is assumed that light beam reflected from an optical disk is collimated by an object lens to be taken out of the light beam path. In FIG. 10, there is shown a light intensity distribution in cross section of a collimated light beam 110 which is reflected from an optical disk in a case where a light beam spot is on a track of an optical disk having pregrooves wherein the light axis is positioned on such a point that X and Y are zero. The light intensity distribution is divided into a first to third regions 111 to 113. If it is assumed that light wave which is incident to the object lens from a light source is uniform in its light intensity distribution within an aperture of the object lens, the first and second regions 111 and 112 are the same in their light intensity as each other. The third regions 113 does not comprise light beam other than zero-order diffraction light from a pregroove of the optical disk, but the first and second regions 111 and 112 comprise light beam in which light beam reflected from the optical disk and diffraction light from a pregoove of the optical disk are mixed. Accordingly, the largest change of light intensity is induced in the first and second regions 111 and 112 in a case where a spot of light beam is deviated off a track of the optical disk. This means that the highest sensitivity is obtained in detecting a track error if lights in the first and second regions 111 and 112 are sampled. The cross sectional position of the first and second regions 111 and 112 are approximately exprressed by the equations (4) and (5) when light beam reflected from the optical disk is converted into collimated light beam because the reflected light is diffraction light from a pregroove of the optical disk.

In the first region 111, $$X^2 + Y^2 \leq \left(\frac{F}{2}\right)^2 \\ \left(X - \frac{f\lambda}{P}\right)^2 + Y^2 \leq \left(\frac{F}{2}\right)^2 \quad (4)$$

In the second region 112, $$X^2 + Y^2 \leq \left(\frac{F}{2}\right)^2 \\ \left(X + \frac{f\lambda}{P}\right)^2 + Y^2 \leq \left(\frac{F}{2}\right)^2 \quad (5)$$

In order to minimize a direct current offset in a track error signal which is induced due to the moving of the object lens in a direction of a track error, a track error signal is obtained in accordance with light amounts of a first and second predetermined portions in the first and second regions 111 and 112 which are expressed by the equations (6) and (7).

For the first predetermined portion in the first region 111, $$(X + \delta)^2 + Y^2 \leq \left(\frac{F}{2}\right)^2 \\ \left(X - \delta - \frac{f\lambda}{P}\right)^2 + Y^2 \leq \left(\frac{F}{2}\right)^2 \quad (6)$$

For the second predetermined portion in the second region 112, $$(X - \delta)^2 + Y^2 \leq \left(\frac{F}{2}\right)^2 \\ \left(X + \delta + \frac{f\lambda}{P}\right)^2 + Y^2 \leq \left(\frac{F}{2}\right)^2 \quad (7)$$

Figure 11:
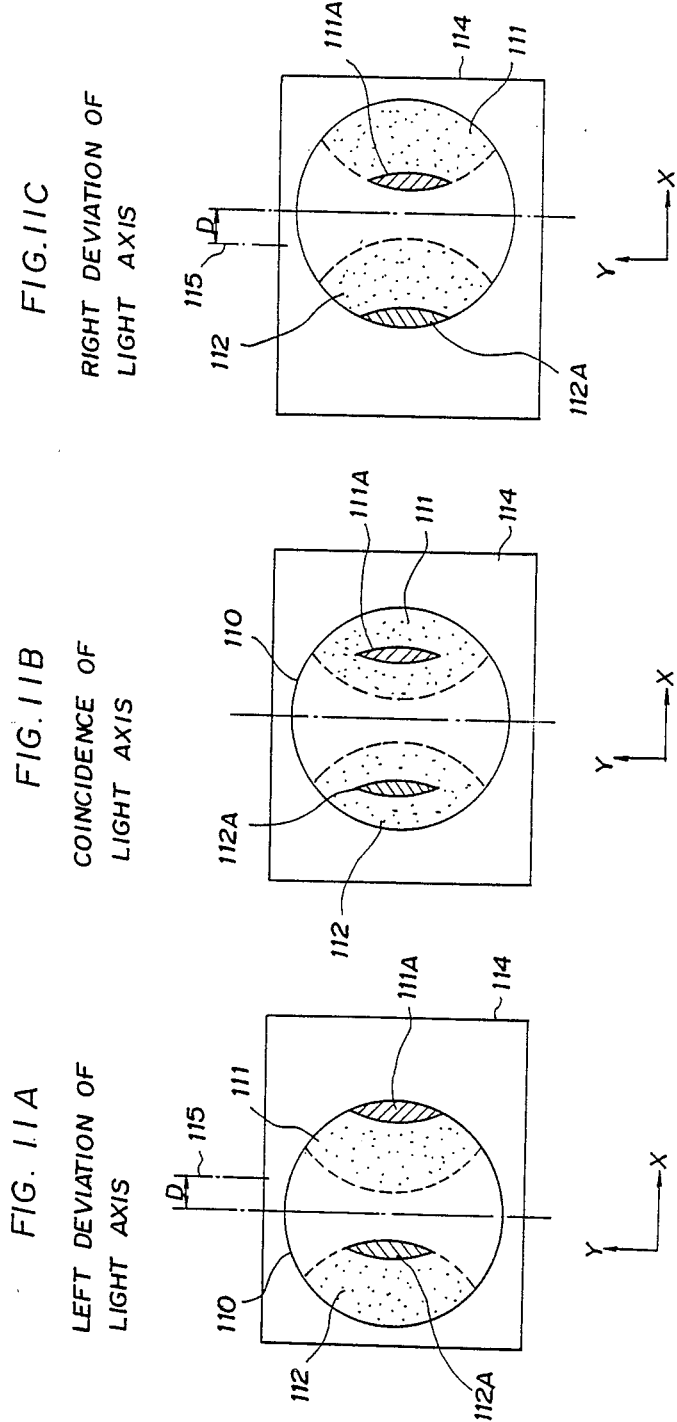

In FIGS. 11A to 11C, there are shown the first and second predetermined portions 111A and 112A in the first and second regions 111 and 112 which are detected by an optical detecting means 114. As clearly shown therein, the first and second predetermined portions 111A and 112A are defined in the first and second regions 111 and 112 having the same area as each other in which the reflected light beam 110 are received even if the light axis 115 thereof is deviated as shown in FIGS. 11A and 11C. For this reason, a direct current offset is prevented in a track error signal from being induced.

Figure 12:
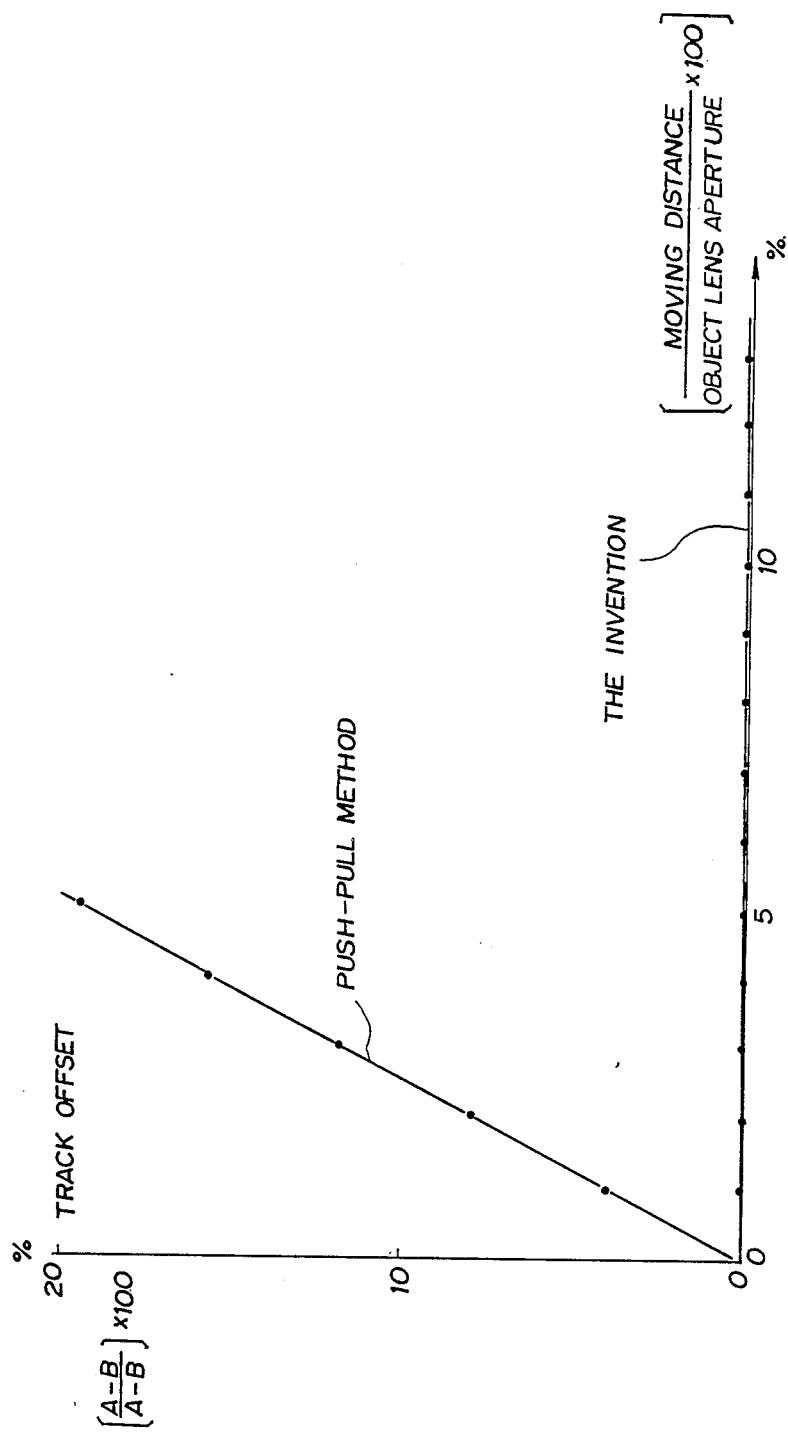
FIG. 12 is an explanatory diagram explaining a comparison between the effects of the invention and conventional push-pull method.

In FIG. 12, there is shown a comparison in a track error signal offset between the present invention and conventional push-pull method which are arithmetically calculated, where A and B are light amounts received in two optical detectors. As clearly shown therein, no track error signal offset is substantially occured in the invention.

If it is assumed that the reflected light beam is not collimated, but focussed or radiated by an object lens, light beams are sampled in the first and second predetermined portions 111A and 112A which are expressed by the equations (8) and (9) as explained in the first embodiment according to the invention.

For the first predetermined portion 111A in the first region 111, $$\left(X - \delta \cdot \frac{d}{F}\right)^2 + Y^2 \leq \left(\frac{d}{2}\right)^2 \\ \left(X + \delta \cdot \frac{d}{F} + \frac{f\lambda}{P} \cdot \frac{d}{F}\right)^2 + Y^2 \leq \left(\frac{d}{2}\right)^2 \quad (8)$$

For the second predetermined portion 112A in the second region 112, $$\left.\begin{array}{l}\left(X+\delta\cdot\frac{d}{F}\right)^2+Y^2\leq\left(\frac{d}{2}\right)^2\\ \left(X-\delta\cdot\frac{d}{F}-\frac{f\lambda}{P}\cdot\frac{d}{F}\right)^2+Y^2\leq\left(\frac{d}{2}\right)^2\end{array}\right\} \quad (9)$$

On the other hand, light amount of the third region 113 (FIG. 10) is kept unchanged substantially even if a track error is occured because no diffraction light is included in the thrid region 113 from a pregroove of the optical disk other than zero-order diffraction light. Accordingly, a stabilized focus error signal is obtained without being affected by a track error signal when a focus error is detected in accordance with light beam incident to the region 113. If it is assumed that the reflected light beam is not collimated, but focussed or radiated to be received in the optical detector, the cross sectional position of the third region 113 is approximately expressed by the equation (10).

$$\left.\begin{array}{l}\left(X+\delta\cdot\frac{d}{F}-\frac{f\lambda}{P}\cdot\frac{d}{F}\right)^2+Y^2\geq\left(\frac{d}{2}\right)^2\\ \left(X-\delta\cdot\frac{d}{F}+\frac{f\lambda}{P}\cdot\frac{d}{F}\right)^2+Y^2\geq\left(\frac{d}{2}\right)^2\end{array}\right\} \quad (10)$$

An optical element having such an effect as mentioned in the above equations can be accomplished by use of a property of reflection, refraction or diffraction.

Figure 13:
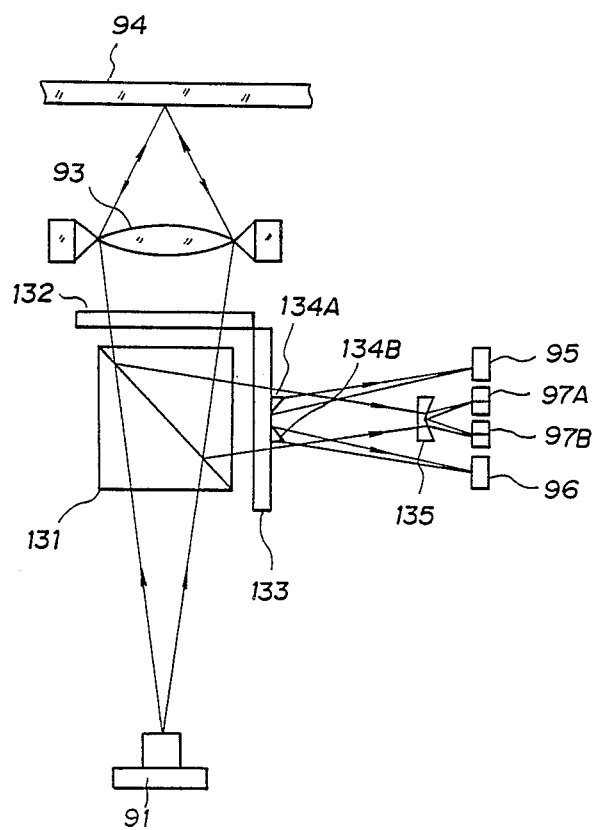
FIGS. 13 and 14 are explanatory views showing apparatus for detecting a track and focus errors in a third and fourth embodiments according to the invention.

In FIG. 13, there is shown an apparatus for detecting a track and focus errors in an optical head in the second embodiment according to the invention wherein like parts are indicated by like reference numerals in FIG. 9 except that the hologram 92 is removed, and a polarizing beam splitter 131, ¼ wavelength plate 132, transparent base plate 133, prisms 134A amd 134B carried on the transparent base plate 133, and foucault prism 135 are provided in place thereof. Further, the optical detector 97 is replaced by two of two-divided optical detectors 97A and 97B. The prism 134A is of a first region expressed by the equation (8) whereby light beam passed through the prism 134A is directed to the first optical detector 95, while the prism 134B is of a second region expressed by the equation (9) whereby light beam passed through the prism 134B is directed to the second optical detector 96.

Now, the foucault prism 135 may be replaced by such an optical element as a cylindrical lens, knife-edge edge and so on.

In operation, light beam reflected from the optical disk 94 is taken out of the light beam path in the presence of the polarizing beam splitter 131 and ¼ wavelength plate 132. The light beam reflected by the polarizing beam splitter 131 is divided to be directed to the first and second optical detectors 95 and 96 by the prisms 134A and 134B. Accordingly, a track error signal is obtained in the calculation of the subtraction between outputs of the first and second optical detectors 95 and 96. On the other hand, light beam which is passed through portions of the transparent baseplate 133 not corresponding to positions of the prism 134A and 134B is incident to the foucault prism 135 to be divided into two light beams which are then received in the two-divided optical detectors 97A and 97B. Accordingly, a focus error signal is obtained in the calculation as mentioned before in accordance with outputs of the four optical detecting segments in the two divided optical detectors 97A and 97B.

Figure 14:
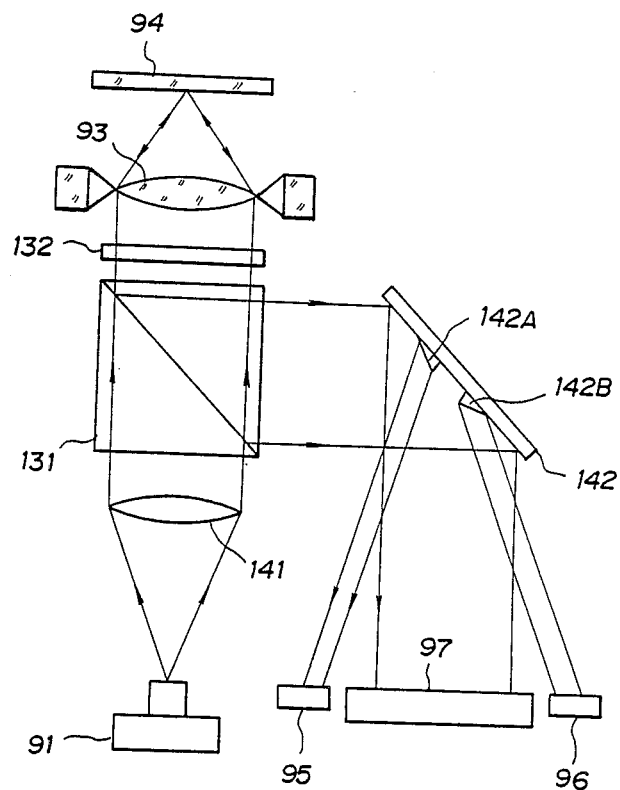

In FIG. 14, there is shown an apparatus for detecting a track and focus errors in an optical head in the third embodiment according to the invention wherein like parts are indicated by like reference numerals in FIGS. 9 and 13 except that a collimating lens 141 is further added, and the prisms 134A and 134B carried on the transparent base plate 133 is replaced by a first and second auxiliary mirrors 142A and 142B carried on a reflecting mirror 142. The first and second auxiliary mirrors 142A and 142B have such reflecting angles thereon that light beams corresponding to the first and second regions expressed by the equations (8) and (9) are directed to the first and second optical detectors 95 and 96.

In operation, the collimated light beam reflected from the optical disk 94 is reflected by the polarizing beam splitter 131. The light beam thus reflected is divided to be directed to the first and second optical detectors 95 and 96 by the auxiliary reflecting mirrors 142A and 142B, while the remaining light beam is directed to the optical detector 97 by the reflecting mirror 142. Accordingly, a track and focus errors are detected in the same manner as mentioned before. The auxiliary reflecting mirrors 142A and 142B may be replaced by hologram segments having fringe patterns thereon which are defined respectively by two spherical waves radiating from respective points on the optical detectors and semiconductor laser.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A method for detecting a track and fucus errors in an optical head comprising steps of,
   radiating light beam to be directed to a recording medium, and
   detecting light amount of light beam which is reflected through an object lens from said recording medium
   wherein said light beam which is reflected is divided in its cross section into light beams of at least a first, second and third regions,
   said first region being expressed in its cross sectional position by the equations, $$\left.\begin{array}{l}\left(X-\delta\cdot\frac{d}{F}\right)^2+Y^2\leq\left(\frac{d}{2}\right)^2\\ \left(X+\delta\cdot\frac{d}{F}+\frac{f\lambda}{P}\cdot\frac{d}{F}\right)^2+Y^2\leq\left(\frac{d}{2}\right)^2\end{array}\right\}$$

said second region being expressed in its cross sectional position by the equations, and $$\left.\begin{array}{l}\left(X+\delta\cdot\frac{d}{F}\right)^2+Y^2\leqq\left(\frac{d}{2}\right)^2\\\left(X-\delta\cdot\frac{d}{F}-\frac{f\lambda}{P}\cdot\frac{d}{F}\right)^2+Y^2\leqq\left(\frac{d}{2}\right)^2\end{array}\right\}$$

said third region being excluded from said first and second regions and expressed in its cross sectional position by the equations, $$\left.\begin{array}{l}\left(X+\delta\cdot\frac{d}{F}-\frac{f\lambda}{P}\cdot\frac{d}{F}\right)^2+Y^2\geqq\left(\frac{d}{2}\right)^2\\\left(X-\delta\cdot\frac{d}{F}+\frac{f\lambda}{P}\cdot\frac{d}{F}\right)^2+Y^2\geqq\left(\frac{d}{2}\right)^2\end{array}\right\}$$

where P is a pitch of pits or pregrooves of said recording medium, $\lambda$ is a wavelength of said light beam, $\delta$ is a value which is from equal to or more than zero to equal to or less than a maximum moving distance of said object lens in a direction of a track error, d is a diameter of said light beam which is reflected, X is an axis which is parallel to a track error direction to intersect the light axis of said light beam which is reflected and Y is an axis which is orthogonal to said X to intersect said light axis, and a track error being detected in accordance with said light beams of said first and second regions, and a focus error being detected in accordance with said light beam of said region.

2. A method for detecting a track and focus errors in an optical head according to claim 1,
wherein said light beam which is reflected is divided by a hologram,
said hologram having a first and second regions corresponding to said first and second regions on which interference fringes are formed corresponding to spherical waves radiating from light source of said light beam and one of two optical detectors for detecting said track error and from said light source and the other of said optical detectors, and having a third region corresponding to said third region on which interference fringes are formed corresponding to spherical waves radiating from said light source and one point of an optical detector for detecting said focus error and from said light source and another point of said optical detector.

3. A method for detecting a track and focus errors in an optical head according to claim 1,
wherein said light beam which is reflected is divided by a prism means,
said prism means including a first and second prism, and a transparent base plate on which said first and second prisms are carried,
said first and second prisms directing said light beams of said first and second regions to a first and second predetermined directions respectively, and
said transparent base plate directing said light beam of said third region to a third predetermined direction in accordance with a remaining portion thereof on which said first and second prism are not positioned.

4. A method for detecting a track and focus errors in an optical head according to claim 1,
wherein said light beam which is reflected is divided by a reflecting mirror means,
said reflecting mirror means including a first and second auxiliary reflecting mirrors, and a base reflecting mirror on which said first and second auxiliary reflecting mirrors are carried,
said first and second auxiliary reflecting mirrors reflecting said light beams of said first and second regions in a first and second predetermined directions, and said base reflecting mirror reflecting said light beams of said third region in a third predetermined direction in accordance with a remaining portion thereof on which said first and second auxiliary reflecting mirrors are not positioned.

5. An apparatus for detecting a track and focus errors in an optical head comprising,
a light source for radiating light beam,
an object beam lens for focusing said light beam on a recording medium,
means for dividing light beam which is reflected from said recording medium in its cross section into light beams of at least a first, second and third regions, and
means for detecting respective light amounts of said light beams to produce a track and foucus error signals,
wherein said first region is expressed in its cross sectional position by the equations, $$\left.\begin{array}{l}\left(X-\delta\cdot\frac{d}{F}\right)^2+Y^2\leqq\left(\frac{d}{2}\right)^2\\\left(X+\delta\cdot\frac{d}{F}+\frac{f\lambda}{P}\cdot\frac{d}{F}\right)^2+Y^2\leqq\left(\frac{d}{2}\right)^2\end{array}\right\}$$

said second region is expressed in its cross sectional position by the equations, $$\left.\begin{array}{l}\left(X+\delta\cdot\frac{d}{F}\right)^2+Y^2\leqq\left(\frac{d}{2}\right)^2\\\left(X-\delta\cdot\frac{d}{F}-\frac{f\lambda}{P}\cdot\frac{d}{F}\right)^2+Y^2\leqq\left(\frac{d}{2}\right)^2\end{array}\right\}$$

said third region is excluded from said first and second regions and expressed in its cross sectional position by the equations, $$\left.\begin{array}{l}\left(X+\delta\cdot\frac{d}{F}-\frac{f\lambda}{P}\cdot\frac{d}{F}\right)^2+Y^2\geqq\left(\frac{d}{2}\right)^2\\\left(X-\delta\cdot\frac{d}{F}+\frac{f\lambda}{P}\cdot\frac{d}{F}\right)^2+Y^2\geqq\left(\frac{d}{2}\right)^2\end{array}\right\}$$

where P is a pitch of pits or pregrooves of said recording medium, $\lambda$ is a wavelength of said light beam, $\delta$ is a value which is from equal to or more than zero to equal to or less than a maximum moving distance of said object lens in a direction of a track error, d is a diameter of said light beam which is reflected, X is an axis which is parallel to a track error direction to intersect the light axis of said light beams which is reflected, and Y is an axis which is orthogonal to said X to intersect said light axis, and said track error being detected in accordance with said light beams of said first and second regions, and said focus error being detected in accordance with said light beam of said third region.

6. An apparatus for detecting a track and focus errors in an optical head according to claim 5, wherein said means for dividing is a hologram having a first and second regions corresponding to said first and second regions on which interference fringes are formed corresponding to spherical waves radiating from said light source and one of two optical detectors for detecting said track error and from said light source and the other of said two optical detectors, and having a third region corresponding to said third region on which interference fringes are formed corresponding to spherical waves radiating from said light source and one point of an optical detector for detecting said focus error, and from said light source and another point of said optical detector.

7. An apparatus for detecting a track and focus errors in an optical head according to claim 5, wherein said means for dividing is a prism means including a first and second prisms, and a transparent base plate on which said first and second prisms are carried, said first and second prisms directing said light beams of said first and second regions to a first and second predetermined directions in said means for detecting respectively, and said transparent base plate directing said light beam of said third region to a third predetermined direction in said means for detecting in accordance with a remaining portion thereof on which said first and second prisms are not positioned.

8. An apparatus for detecting a track and focus errors in an optical head according to claim 5, wherein said means for dividing is a reflecting mirror means including a first and second auxiliary reflecting mirrors, and a base reflecting mirror on which said first and said second auxiliary reflecting mirrors are carried, said first and second auxiliary reflecting mirrors reflecting said light beams of said first and second regions in a first and second predetermined directions in said means for detecting, and said base reflecting mirror reflecting said light beams of said third region in a third predetermined direction in said means for detecting in accordance with a remaining portion thereof on which said first and second auxiliary reflecting mirrors are not positioned.

* * * * *

UNITED STATES PATENT AND TRADEMARK OFFICE
CERTIFICATE OF CORRECTION

PATENT NO. : 4,841,508
DATED     : June 20, 1989
INVENTOR(S) : Yasuo Kimura

It is certified that error appears in the above-identified patent and that said Letters Patent is hereby corrected as shown below:

Column 4, line 59, delete "selecting" and insert --reflecting--.

Column 9, line 36, delete "exprressed" and insert --expressed--.

Column 11, line 13, delete "thrid" and insert --third--.

Signed and Sealed this

Fourteenth Day of August, 1990

Attest:

HARRY F. MANBECK, JR.

Attesting Officer

Commissioner of Patents and Trademarks